US007016986B2

(12) United States Patent
Fasolt

(10) Patent No.: US 7,016,986 B2
(45) Date of Patent: Mar. 21, 2006

(54) CONFIGURATION OF AN INFORMATION SYSTEM FOR A TRANSPORT VEHICLE SUBSYSTEM THAT TRANSMITS COMPONENT INPUT/OUTPUT RULES FOR THE INFORMATION SYSTEM

(75) Inventor: Johannes Fasolt, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 196 days.

(21) Appl. No.: 10/196,553

(22) Filed: Jul. 17, 2002

(65) Prior Publication Data

US 2003/0028689 A1 Feb. 6, 2003

(30) Foreign Application Priority Data

Jul. 17, 2001 (DE) ................................ 101 34 717

(51) Int. Cl.
*G01M 17/00* (2006.01)
*G06F 7/00* (2006.01)
*G06F 13/00* (2006.01)

(52) U.S. Cl. ..................... 710/8; 710/1; 710/9; 710/10; 701/29; 701/33; 701/35; 701/36; 701/202

(58) Field of Classification Search ................ 701/202, 701/35, 33, 29, 36; 710/1, 8–10
See application file for complete search history.

(56) References Cited

U.S. PATENT DOCUMENTS 6,202,008 B1 * 3/2001 Beckert et al. ............... 701/33
6,430,488 B1 * 8/2002 Goldman et al. ............. 701/36
6,532,406 B1 * 3/2003 Schmedding et al. ......... 701/29
6,622,083 B1 * 9/2003 Knockeart et al. .......... 701/202
6,701,161 B1 * 3/2004 Wendling ................ 455/556.1

FOREIGN PATENT DOCUMENTS

DE 4315494 9/1994
DE 19531415 2/1997
DE 19807410 8/1999
DE 19818262 10/1999
EP 1026041 8/2000

* cited by examiner

*Primary Examiner*—Tammara Peyton
(74) *Attorney, Agent, or Firm*—Crowell & Moring LLP

(57) ABSTRACT

A method and a system for configuring an information system in a vehicle is provided, in which a set of input/output rules is stored in a storage medium of the information system. An output, an input, and/or input/output processes of the information system are configured in accordance with the set of input/output rules. The method is further developed such that the integration of retrofitted components occurs automatically and in adaptation to the input/output rules of the information system. For this purpose, when connecting an additional component to the information system, a component-input/output rule is transmitted via an interface with the information system. The component-input/output rule is integrated into the output, the input and the input/output processes.

9 Claims, 5 Drawing Sheets

CONFIGURATION OF AN INFORMATION SYSTEM FOR A TRANSPORT VEHICLE SUBSYSTEM THAT TRANSMITS COMPONENT INPUT/OUTPUT RULES FOR THE INFORMATION SYSTEM

BACKGROUND AND SUMMARY OF THE INVENTION

This application claims the priority of German Application No. 101 34 717.0, filed Jul. 17, 2001, the disclosure of which is expressly incorporated by reference herein.

The invention relates to a procedure for configuration of an information system for a transport vehicle and an arrangement for carrying out this procedure.

Retrofitting components in a transport vehicle, especially in an automobile or aircraft, can only be implemented on a very limited basis due to a lack of technical preparation. In future vehicles, this will become possible through customized interfaces such as, for example, Bluetooth. However, as a result, questions are posed as to the operation of such retrofitted systems. Specifically, retrofitted software in the field of information and consumer electronics is directed to an operation via the input and output devices present in the vehicle. Function keys, touch screens, mice, etc. are available as input devices for haptic operations, and microphones for speech input. Graphic display devices, such as monitors, lights, etc. are used for visual output, or loudspeakers for speech output.

So-called information systems with multi-function operating stations, which, with graphic monitors as output means and the accompanying operating elements as input means, offer a high degree of flexibility, and are increasingly available for operations in the field of transportation. However, driving safety requires a strict schematization of the multi-function unit that can be operated by the driver without serious distraction. This schematization expresses itself by determination of the input/output rules for these multi-function operating stations. Thus, it can be determined in these rules that no haptic operation is permitted to occur or that a monitor can only display messages in a minimum character size.

A multi-function operating station is known from German Patent 198 07 410 A1, whose function keys are partly configured as freely programmable state of the art technology. This achieves a user-friendly selection and steering of the individual function groups within a multi-function operating station, the central point being on a driver-customized assignment of the function key. Thus, a multi-function operating station is known in which an operating rule of the function keys is provided according to which function keys can subsequently be deprogrammed after installation in the vehicle.

With retrofitted components, the difficulty then consists in enabling maximum operability with simultaneously strict schematization, since neither can the scope and type of the functionality or the interaction requirements of the components to be operated be predicted, nor can the information systems be standardized in relation to all vehicle equipment, all production series, or across all vehicle brands.

European Patent 1 026 041 A2 discloses a multi-functional operating station for motor vehicles that has at least one additional, henceforth freely programmable and possibly macro-command-capable function key, via which at least one additional equipment component can be controlled in the motor vehicle. This multi-function operating station can be adapted to individual design requirements. A subsequent change to the outfitting of a vehicle by expansion or replacement of devices can thus be carried out by manual programming of the operating station.

Laid Open German Patent 198 18 262 A1 describes a procedure and a device for the operation or use of various devices in motor vehicles. In order to be able to operate all networked speech-input-driven devices via a central speech-operated module, the functional and/or furnished characteristics of every device are electronically and automatically queried in the process by the central speech-input module or automatically communicated by the device in question.

An input device, transmission and storage of information for a motor vehicle that has a unit for wireless data transmission to a vehicle information system is known from German Patent 195 31 415 A1. This device permits the operation of different components in the motor vehicle.

A system and a method for programming at least one motor vehicle control device is disclosed in Laid Open Publication DE 43 15 494 C1. In this case the networked control devices are programmed via vehicle configuration data stored in the central control device by means of the central control device.

The objective of the present invention is to further develop an information system configuration for controlling the components in such a manner that the integration of retrofitted components, as well as the means of input/output, should occur automatically and in adaptation to the input/output rules of the information system. Moreover, the present invention additionally relates to a device for carrying out this procedure.

This objective is achieved, according to the present invention, by a method for configuring an information system in a vehicle, in which a set of input/output rules is stored in a storage media of the information system. An output means, an input means and/or the input/output processes of the information system are configured in accordance with this set of input/output rules. A component-input/output rule is transmitted via an interface to the information system when connecting an additional component to the information system. The component-input/output rule is integrated into the output means, the input means and the input/output processes. The information system sends its set of input/output rules to the component and the component prepares a component-input/output rule for the information system. Later, when an additional component is connected to the information system, a component-input/output rule is transmitted via an interface with the information system. The component-input/output rule is integrated by the information system into the input/output module and the input/output processes so that the component can be driven via the information system.

All communication and interaction processes between output means, input means, information systems and/or components are considered to be part of the input/output processes.

The set of input/output rules contains information about the version, the selection possibilities, the expansion possibilities, the type and manner of operation and the input and output means, as well as the possible communication and interaction processes of the information systems. For example, it is illustrated therein which menu tree is already available, whether speech input or output is possible, whether a graphics display is available and whether functional states are available.

Via the input/output rules, additional conditions can be determined, in which it is indicated that the maximum number of displayable entries in a graphic display must not exceed a specific value. Through the rules, it can also be indicated that, although function keys are available as the input means, only a speech operation is permitted. The version indication is provided for documentation and testing purposes.

Also falling under the component-input/output rule is the fact that an appropriate classification is to be used for a type of component-input/output rule that is already stored in the information system. This method can be advantageous in the retrofitting of standard components.

By installing an information system in a vehicle, it can be predetermined that, for reasons of driving safety, the operation of the information system by the driver must be done without serious distraction. The input technologies known from the computer world, such as mouse or touch screen, thus cannot be used while driving in the vehicle for safety-related reasons, since the free positioning of the cursor arrow or human finger without haptic support requires an increased attentiveness of the operator.

The inventive method has the advantage that the operation and output of information of the information system is controlled via the set of input/output rules and thus can be adapted to the use situations of the information system. Especially in information systems that come into use in the vehicle, the input/output rules can be set too restrictively.

In a further development of the method according to the present invention, the information system tests whether the form of the output means, the input means and/or the input/output processes requested by the component-input/output rule is permissible. A permissible component-input/output rule is integrated by the information system into the input/output module and the input/output processes, so that the component can be controlled via the information system.

The component to be connected to the information system accordingly contains a component-input/output rule that represents its operating and output requirements. Since, in the retrofitting of hardware or software components, the input/output rules of the information system are generally not known to the retrofitted components, the component-input/output rule must be checked against that of the information system. Only if this test has a positive result, that is, it yields agreement, can the component be integrated into the information system.

This check can be made by means of a standardized description of the input/output rules. Thus, the agreement can then be determined in this check in relation to data type and data value.

This has the advantage that it can be controlled with one check whether the operation of the retrofitted component can occur at all via the information system according to the parameters of the information system.

If the information system has recognized a component-input/output rule as permissible, i.e., the operating requirements of the component correspond to the parameters of the information system for its input/output module and input/output processes, then this component is integrated into the information system. From this point in time, the component is available via the information system.

In the integration, the system, for example, in the case of a monitor, generates a graphic illustration for a new menu item and for the following sub menus using an individual layout algorithm. Or, the integration system takes care of the expansion of dictionaries for speech recognition and speech output. The integration also includes that, with the activation of a new menu item, the appropriate action for the component is triggered and any response messages of the component also are acquired for output.

This method has a great advantage in that the integration of retrofitted components with a permitted component-input/output rule in the information system can occur automatically, that is to say, without manual programming and adapted to its input/output rules.

It is another advantage of this method, that to the extent a plurality of information systems is available in the vehicle, these procedures can also be used in parallel. Thus, the additional components can be interfaced with all available information systems. Depending on the position and/or outfitting of the input/output means and the purpose of the information system in question, different conditions may result for the permissibility of a component-input/output rule. For example, an information system in a vehicle that, for safety reasons, permits only speech operations can be available for the driver while, on the other hand, an information system that is mounted in the rear of the vehicle makes available substantially more input/output possibilities, since the passenger can dedicate more attention to operation.

The parallel use of this method also has the additional advantage that the same component, and with it different information systems, can be operated from different positions in the vehicle. Primarily, in vehicles that must make available information systems for more than one person, such as airplanes, busses, etc. or vehicles that have an indeterminate length, such as trains, tractor trailers, etc. the driving of a component from different information systems in the vehicle is advantageous.

Another advantage of this method is that all components that are able to be driven via an information system can be dynamically integrated. To do this, it is necessary to establish initially the input/output rules and the possible input/output processes for the information system. In this view, each component is then treated as a retrofitted component. In a vehicle, this method can be implemented in such a manner that, at the start of the system, all available components are awakened by the vehicle bus, enter into dialog with the information system and have their component-input/output rule integrated in the input/output module and input/output processes of the information system. This operation does not have to be executed anew for each start of a course of events in the operation of a vehicle, since the information system can optionally be outfitted with a non-volatile memory for the rules and processes.

In a further development of the method according to the invention, the information system sends its set of input/output rules to the component and the component prepares a component-input/output rule that is harmonized with the information system in question.

The advantage of this method is that a component to be retrofitted can adapt its operation to the parameters of the information system. For example, a parameter of this type for an information system could be that only speech operation is permitted. A component to be retrofitted that has available a number of operating options, such as speech, function keys, touch screen, etc., can adapt its component-input/output rule accordingly. Furthermore, a parameter of the information system can be that only one four-element operating element is available. The components now must adapt their component-input/output rule to this marginal condition of the information system in order to be able to be integrated into the information system. A prerequisite is that the component bears a function logic circuit that enables it to understand the set of input/output rules of the information system, and to adapt its component-input/output rule accordingly. Primarily with retrofitted software components, for example, in the field of information and entertainment, this can be accomplished without great effort.

In a further development of the method according to the present invention, the component-input/output rule of a hardware or software component to be integrated is not supplied by the component itself, but rather is downloaded via a telematic interface from a service at a distant location. To do this, the component transmits a reference to this external service during information system logon. If the information system receives this reference, the component-input/output rule can be downloaded from this service, or made available for this service from the server.

A clear advantage of this method is that the hardware or software component does not have to bear its own function logic circuit. This can in some cases constitute an unjustifiable expenditure of resources on the component side. The prerequisite is that the information system has access to a telematic interface, which today is standard for many applications, such as fleet management or dynamic navigation control for a vehicle.

A further development of the method according to the present invention is that an already integrated component that is decoupled from the information system logs-off of the information system, and the information system removes the component-input/output rules and the corresponding input/output processes. Moreover, a message to the operating station is provided.

This method has the advantage that, in the input/output module of the information system, only components that are also actually present are displayed, and the operator is informed when a component is no longer available.

Furthermore, it is advantageous to expand the method according to the present invention in such a manner that, when integration is not possible or a component-input/output rule is not permitted or a hardware or software component is decoupled, a corresponding message is prepared in the output module and stored in the storage medium of the information system.

This has the advantage that the operator is informed about the status of the integration. Moreover, locating faults is made easier, whereby it can even occur at any desired time, since the fault messages are stored in the information system.

In a further development of the method according to the present invention, the set of input/output rules and/or the component-input/output rule is transmitted via a wireless interface to the information system or to the components.

The advantage of this method is in the application of modern wireless data transmission between the information system and the components. By using protocols such as Bluetooth, components and/or operating stations can be linked to the information system and operated in a wireless manner. Specifically, the retrofitting of components or operating stations in a vehicle is thus subject to hardly any limits anymore, since technical retooling is no longer necessary. Primarily, this means components such as laptops, cell phones, personal digital assistants, headphones, etc., wherein a wireless communication interface is already considered to be standard equipment and, thus, immediately available to the information system.

The method according to the present invention can advantageously be developed further in that, before the start of the integration process, the information system checks whether the information system is ready to integrate an additional component and/or operating station. In this manner, it is possible to check whether the technical prerequisites for the integration of a component, such as, for example, whether there is sufficient storage capacity in the information system. Additional checkpoints may be established by the set of input/output rules of the information system, for example, that only a certain number of components can be integrated or that, based on safety or company-specific parameters, any expansion of the information system is prohibited. In vehicles, especially the momentary driving situation can be included in the check. For example, the integration of a component into the information system must be done only with the vehicle standing still.

The fact that the integration process for a component to be integrated is not started unnecessarily and that system overloading of the information system and the component is prevented, is seen as an advantage of this method.

Preferably, a component can also represent an additional input and/or output means. When connecting an additional input and output means to the information system, their corresponding input and/or output rule is transmitted via an interface to the information system. The information system checks whether this input/output rule can be unified with the existing set of input/output rules. If this check is successful, the input and/or output means are integrated into the input/output processes. As a result, the input and/or output means are available as operating stations for the information system.

The operating station can be composed of an input means and/or output means and, thus, can accept the specifications of a personal digital assistants (PDA) or cell phones. Since the input and/or output rules of the operating station to be coupled are checked as to admissibility first by the information system, it is ensured that the set of input/output rules is observed. For example, the rule of the information system can be prescribed for an operator of a fleet of vehicles that menu structures, for ergonomic reasons, must be only five layers deep, while design reasons of the operating station only permit a menu breadth of four. Then a rule infraction is present and the operating station would not be permissible for the information system involved.

The additional operating station can include, along with the already mentioned input/output rules, a personalized display, such as a particular display color, wallpaper and monitor desktop. Thus, a user can compose his personalized operating station. He decides on an operating station that pleases him, possibly carries out more personalized display options and carries them with him. If needed, the personalized operating station is coupled to the desired information system and the user communicates with the information system in the operating station entrusted to him.

The advantage of this method is that personalized operating elements, i.e., operating stations adapted to the user, can be made ready to operate an information system, as long as they conform to the rules of the information system. The application of this method is not limited to a vehicle. Applications in all areas in which a user communicates via an operating station with a system are contemplated, for example, ATM's, ticket machines, home appliances, telecommunication devices, etc.

These objectives are achieved according to the present invention. Accordingly, a component-input/output rule defines the output means and the objects that are issued via this output means. This includes, for example, data about whether a graphic display or speech output is to occur. Additional data in the case of the graphic display would be the corresponding building blocks for the monitor structure or with speech output the expansion of the speech vocabulary or the text components. Moreover, the input/output rule describes the input means, thus an indication of whether the operation is to occur via speech input, function keys, touch screen, etc. and the objects necessary for this. Furthermore, the function of the input means, the input/output processes and the back-coupling to the output means must be determined via the input/output rule. For example, the function description for the PLAY key of a CD player includes that by pressing the PLAY key the information system must transmit a message to the component CD player, the component CD player starts the playing of the CD and sends back the track number of the currently played song to the information system. The information system illustrates this according to the component-input/output rule in the output unit in the defined menu item. This method for describing the input/output processes permitted in an information system and/or input/output means for a conveyance is preferably used in the retrofitting of components.

An advantage of this method is that through it a standardized description of the input/output rules is established that can be processed by the information system as well as by the component.

In a further development of the method according to the present invention, the interactions requested by the components between the information system and the component are defined in the component-input/output rule. Through this method, for example, which protocol is used for the communication, which signals the information system must supply to the component for it to react correctly to an input via the input means, etc. are communicated to the information system.

The advantage of this method lies in the fact that even in checking the admissibility of a component-input/output rule, as to whether integration is possible, can be determined by the information system. Moreover, the information system needs this description to correctly drive an integrated component in the operation via the information system.

The objective is achieved according to the present invention by a device, a component of which has a storage medium for storing the component-input/output rule. Moreover, an interface is provided for the exchange of this component-input/output rule between the component and the information system. The information system includes a validation system for checking the admissibility of the transmitted component-input/output rule.

In this way it is ensured that the component can transmit its component-input/output rule to the information system. The interface can be realized as a data bus interface with the corresponding data bus protocols. For components from the field of entertainment or information, interfaces for wireless data communication in connection with protocols such as Bluetooth are to be preferred.

The information system on its part must check whether the transmitted component-input/output rule can be converted by means of the parameters of the information system, thus, the input/output means and input/output processes. This is the task of the validation system.

Moreover, it is advantageously indicated that there is a set of input/output rules in the storage medium of the information system, and the validation system, via this set of input/output rules, checks the component-input/output rule for admissibility. If the component-input/output rule has been recognized as admissible by the information system, the component in question can be integrated into the information system.

It is indicated in an advantageous design of the device according to the present invention that the input/output means and the input/output processes of the information system are configured according to the set of input/output rules. The specific configuration of a component is made via the component-input/output rule.

Moreover, it is advantageously indicated that in addition, or alternatively, a portable input and/or output means is provided for operation of the information system and the components driven via the information system. In this way, operating stations personalized for the user may be interfaced with the information system.

There are, of course, different possibilities for designing and further developing the concept of the present invention. To do this, reference is made, on the one hand, to the dependent claims and, on the other hand, to the explanation of a design that follows. The advantageous designs that result from any desired combination of features of the different dependent claims must also be incorporated. Illustrated in the drawing is a representation of the method of the present invention and a corresponding device. Shown in schematic representation are Other objects, advantages and novel features of the present invention will become apparent from the following detailed description of the invention when considered in conjunction with the accompanying drawings.

DETAILED DESCRIPTION OF THE DRAWINGS

Figure 1:
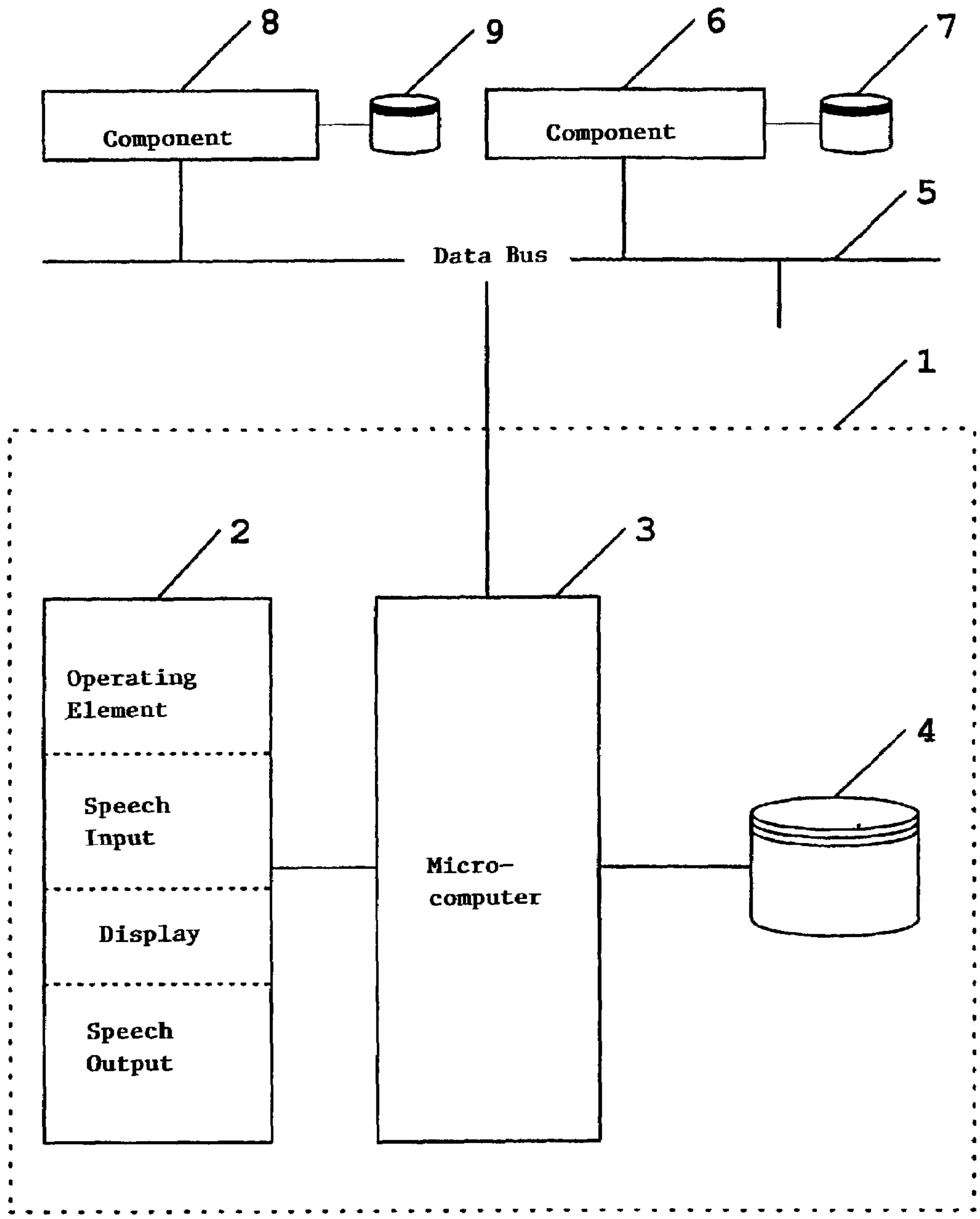
FIG. 1 is a schematic illustration of a device for carrying out the method according to the present invention.

Information system 1 in a vehicle is comprised of an operating station 2, a storage medium 4 and a microcomputer 3, which are electrically connected to each other. Components 6 and 8 have a connection to the information system 1 via a data bus 5.

Data bus 5 can be provided as an optical MOST or D2B bus or as an electrical CAN-bus in a transport vehicle, especially an automobile.

Operating station 2 includes the input and output devices of the information system 1 which, in this case, for example, are composed of operating elements, speech input/output and display. The operating elements can be implemented using function keys. A microphone is available for speech input; the display is done via a monitor; and speech output is done via loudspeaker.

The control of operating station 2 is done via microcomputer 3, which also assumes the function of a man-machine interaction (MMI) manager. In this function, microcomputer 3 ensures that the input signal from the input means of operating station 2 is forwarded to the appropriate component 6 and 8 and the back-coupling of signals from components 6 and 8 are correctly forwarded to the output means and issued.

Microcomputer 3 is connected to a storage medium 4 in which the set of input/output rules that are valid for the information system 1 is stored. The process logic circuit available in microcomputer 3 validates the input/output rules stemming from components 6 and 8 or from the input/output devices of operating station 2. In this way, it is guaranteed that the modules, which can be driven via the information system, satisfy the set of input/output rules. Storage medium 4 is also used for storing the recorded information of the information system. Thus, for example, if validation of a component-input/output rule is not possible, a message is issued to operating station 2 and a corresponding data record is stored in storage medium 4.

Components 6 and 8 are connected via an interface to data bus 5. Moreover, components 6 and 8 have a storage medium 7 and 9, respectively, for storing its part of a component-input/output rule.

Figure 3:
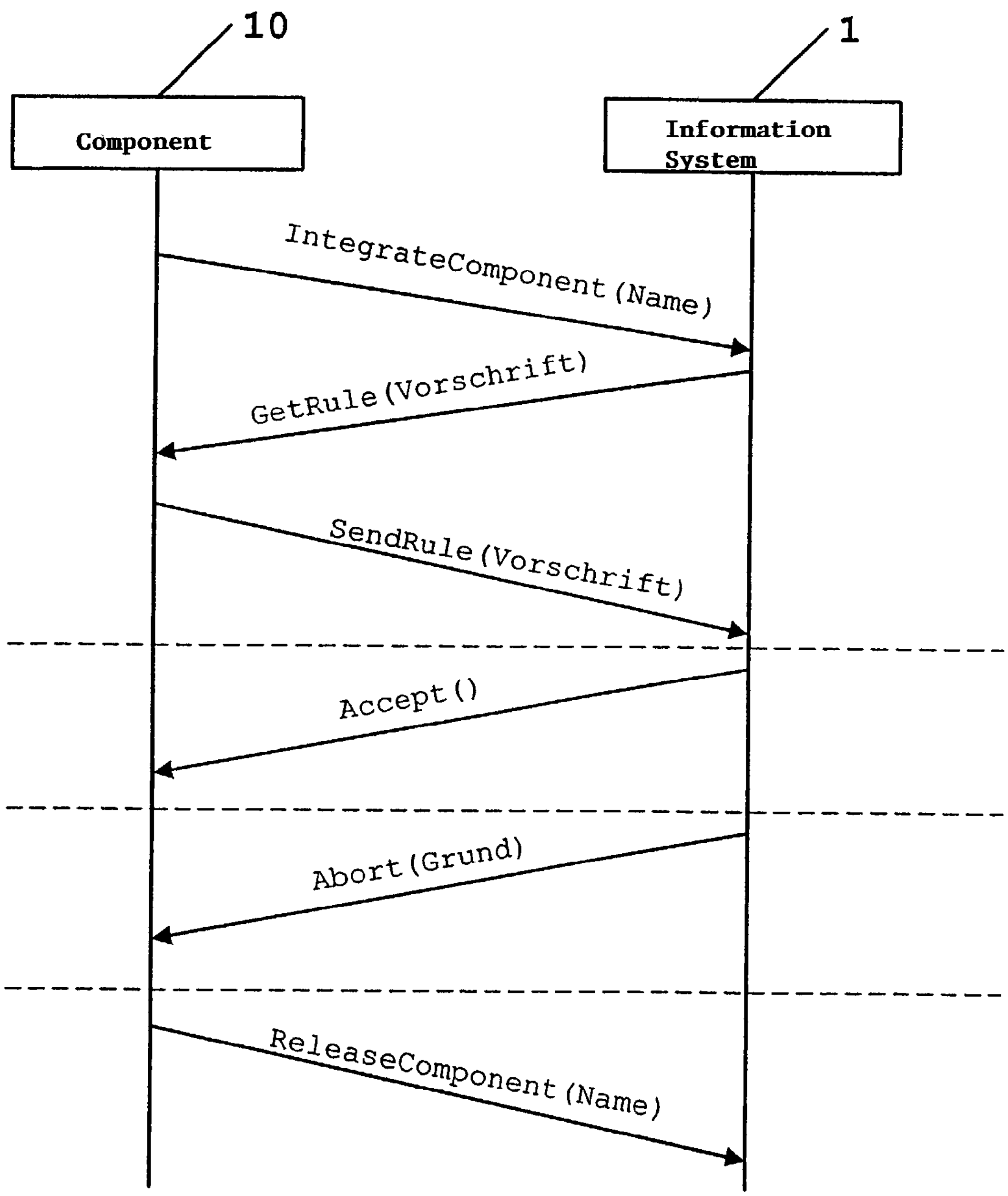
FIG. 3 is a flow diagram for carrying out the method of the present invention.

A flow diagram for the sequence of interactions between a component 10 to be integrated and the information system 1 via data bus 5 is illustrated in FIG. 3. First, new component 10 sends the message "IntegrateComponent(Name)" to information system 1 in order to indicate its desire to be integrated into the operating station 2. An identification ID, such as device name or hardware address of the component 10 becomes a parameter with which it can be identified. Information system 1 then decides whether the component can be integrated. In this way, information system 1 falls back on its set of input/output rules stored in storage media 4, in which driving-dynamic, safety-relevant technical rules are stored. For example, at this point one can check whether the accommodation of new components is only permitted when the vehicle is at a standstill, whether no expansion is allowed because of parameters of a vehicle fleet operator, or whether, for safety reasons, expansion with additional components is generally prohibited. At this point, one can also check whether the information system has available to it sufficient storage and/or computer capacity to be able to integrate additional components.

If information system 1 can integrate component 10, it sends a message "GetRule(rule)" to component 10. This message transmits to component 10 the set of input/output rules that are stored in the storage media 4 of information system 1.

Based on the component input output rule of the information system 1 and the statement of input/output rules, the component 10 produces an input/output rule adapted to the corresponding information system 1 for the particular component 10. The adapted component-input/output rule is transmitted using the message "SendRule(rule)" to information system 1. If a component cannot satisfy the set of input/output rules of information system 1, then it communicates this to the information system 1 by sending, for example, an empty rule. The information system 1 can then react to this by, for example, interrupting the dialog or sending a message to the operating station and/or logging an entry in storage medium 4. If component 10 does not have available to it a logic module to adapt the component-input/output rule to the set of input/output rules, the component 10 can send its component-input/output rule directly to the information system. If component 10 has not stored the component-input/output rule and the conveyance has available to it a telematic interface, then it sends in the message "SendRule(rule)" the reference to the external service from which information system 1 can download the component-input/output rule.

By means of the validation function of microcomputer 3, the rule sent from component 10 is checked by the information system as to its admissibility. If there is agreement of the component-input/output rule with the set of input/output rules, then the component is integrated into the information system 1. After the interconnection has been accomplished in the input/output media and in the input/output processes, the information system 1 sends a message "Accept( )" to component 10.

If the integration of a component-input/output rule of a component is rejected by integration system 1, it is communicated by the information system by means of the message "Abort(reason)". The reason for the rejection is carried as a parameter. Component 10 can start the integration process anew after a re-adaptation by means of the message "SendRule(Rule)". Thus, the interaction protocol permits arriving at a suitable integration in several iteration steps. With "Abort(reason)" on the part of information system 1, it can also be communicated to component 10 that after successful integration, due to other events, such as storage requirement for an important component or instructions to the operating station, the corresponding component is removed from the information system. The messages forwarded to component 10 are logged in storage medium 4.

If component 10 is to be removed from information system 1, it sends the message "ReleaseComponent(Name)" to information system 1. The identification of the component is transmitted as a parameter.

Figure 2:
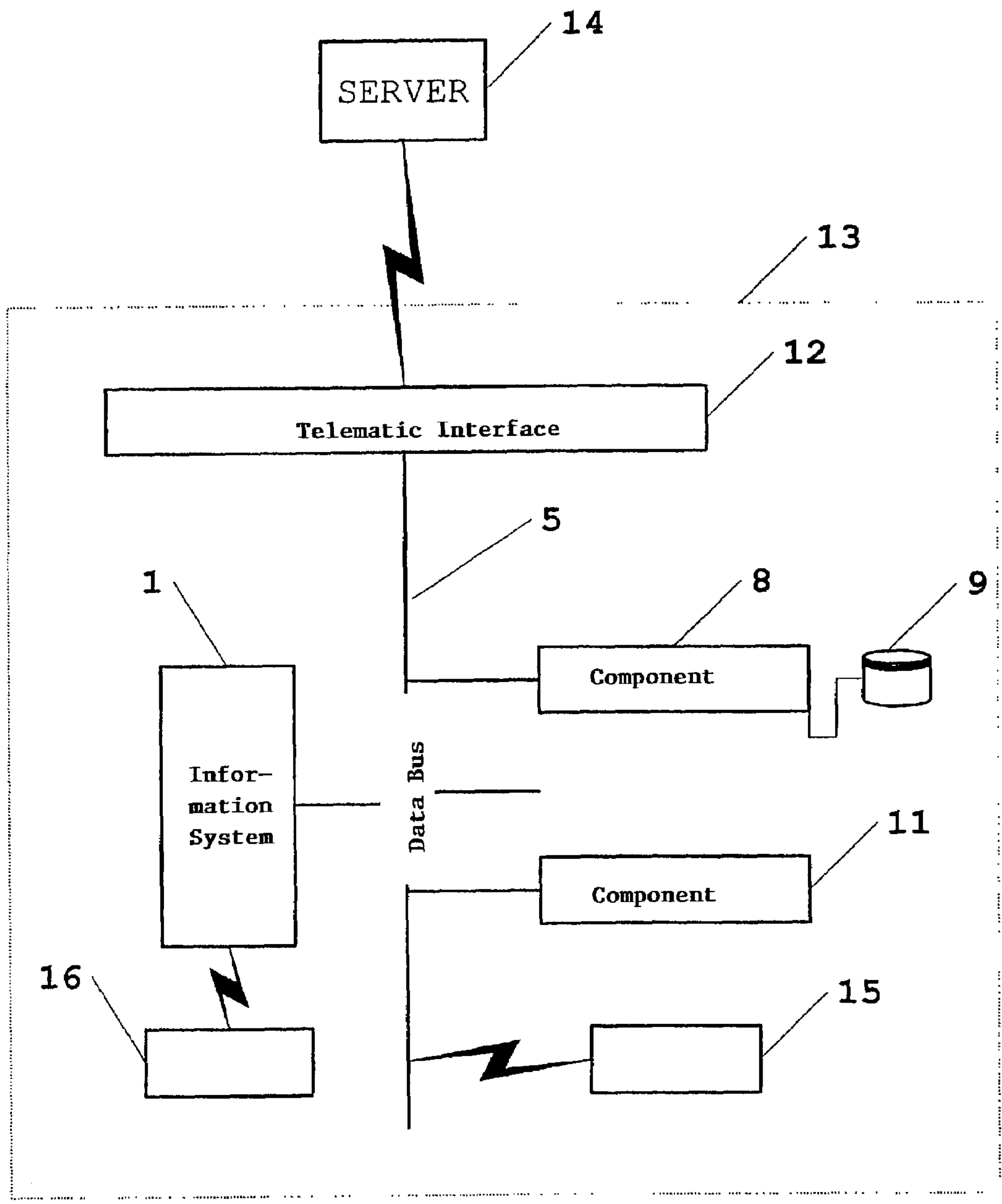
FIG. 2 is a schematic overview of the device showing the possibility of a wireless interface for carrying out the method of the present invention.

A schematic representation of another device for carrying out the method of the invention is illustrated in FIG. 2, which shows different possibilities for interfacing components and/or operating stations. A vehicle 13 is equipped with a telematic interface 12. If the component 11 to be integrated has no storage medium available to it for the component-input/output rule, then information system 1 can download the necessary input/output rule from an external service (server) 14 through a databus 5 via the telematic interface 12. This can be useful, especially when retrofitting software components, since they must often be updated. The electric interface of a component 15 and/or 16 (and/or an operating station 15 and 16) to be integrated can be accomplished by wireless data transmission via data bus 5 or directly to the information system 1. This configuration is especially advantageous, primarily with regard to the use of protocols such as Bluetooth that simplify the interfacing of components such as laptops, cell phones, etc. For operating stations that are personalized for the user, the wireless data transmission is also a great advantage since the user carries his personalized operating station 15 and 16 with him and, in the case of using this operating station 15 and 16, must link it to the appropriate information system. Thus, this application in no case is limited to a vehicle. For example, the information system could represent a user interface for any automatic device. As soon as the integration of the operating station has been accomplished, the user can operate the automatic device using his personalized operating station.

The input/output rules can contain the following information:

TreeWidth: number of selection possibilities. The traffic capability of information system 1 is based on the major limitation of the possibility of a selection from a menu. This can be ensured with the limitation of the selection possibilities to, for example, the maximum number of the displayable entries or to the number of function keys of an operating element. Menus are hierarchically arranged and form a menu tree. Thus, for example, the tree width can be set to 2.

SpeechRecognition: This information gives information about whether speech recognition is available and whether it can be used on the basis of the set of input/output rules.

SpeechOutput: This information provides information about whether speech output is available and whether it can be used on the basis of the set of input/output rules.

Version: The version of definitions.

DynamicType: The component in this case indicates its application type. A typing of the applications can be carried out for the integration of a component in the fitting place of an already existing menu tree. From this, the information system determines the competent docking point in the overall operation. The docking point thus corresponds to a menu item from which a menu of the component in question can be selected via an operator action, for example, pressing a button. An exemplary classification would be traffic for traffic applications, diagnosis for diagnostic applications, entertainment for entertainment applications, communication for communication applications, generic for applications that cannot be classified, game for games and information for information about the conveyance.

DynamicMenu: The image visible on a monitor in a certain condition of the user dialog is designated as a menu. It contains information about different menu elements such as text, images, etc. By activating operating elements, one can navigate between different menus.

DynamicFunction: Information on the setting course of the functions of a component. One such function call is comprised of the sending of a message to the component, which carries out an action independent of its momentary condition. This can result in changes in the menu to be activated. Functions can be composed in pairs and are characterized as "diametral"—this is taken into account in the positioning on the screen, as, for example, minus and plus in a temperature setting.

DynamicText: Menu element for the display and input of textual content.

DynamicSlider: Menu element for the display of scale values.

DynamicPicture: Menu element for the output of raster graphics.

DynamicList: Menu element for the display of lists and the selection of desired entries.

DynamicSound: Menu element for the output of acoustic signals.

DynamicSpeechOutput: Menu element for the output of speech messages.

The input/output rules can also contain complex elements for special application-specific purposes, such as DynamicCalendar, that is, menu elements for the output of a calendar. The input/output rules can be defined in XML as well as in any other desired technical formats.

Figure 4:
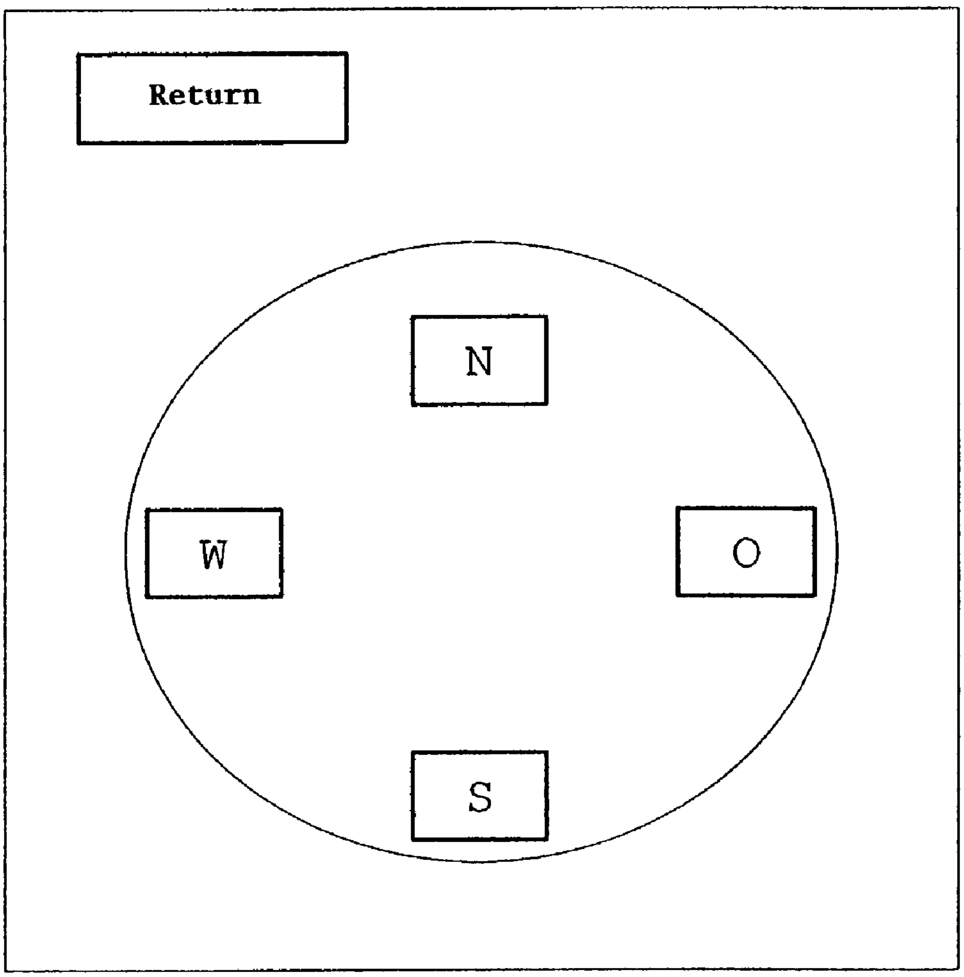
FIG. 4 schematically illustrates a 4-way operating element with a back key.
Figure 5:
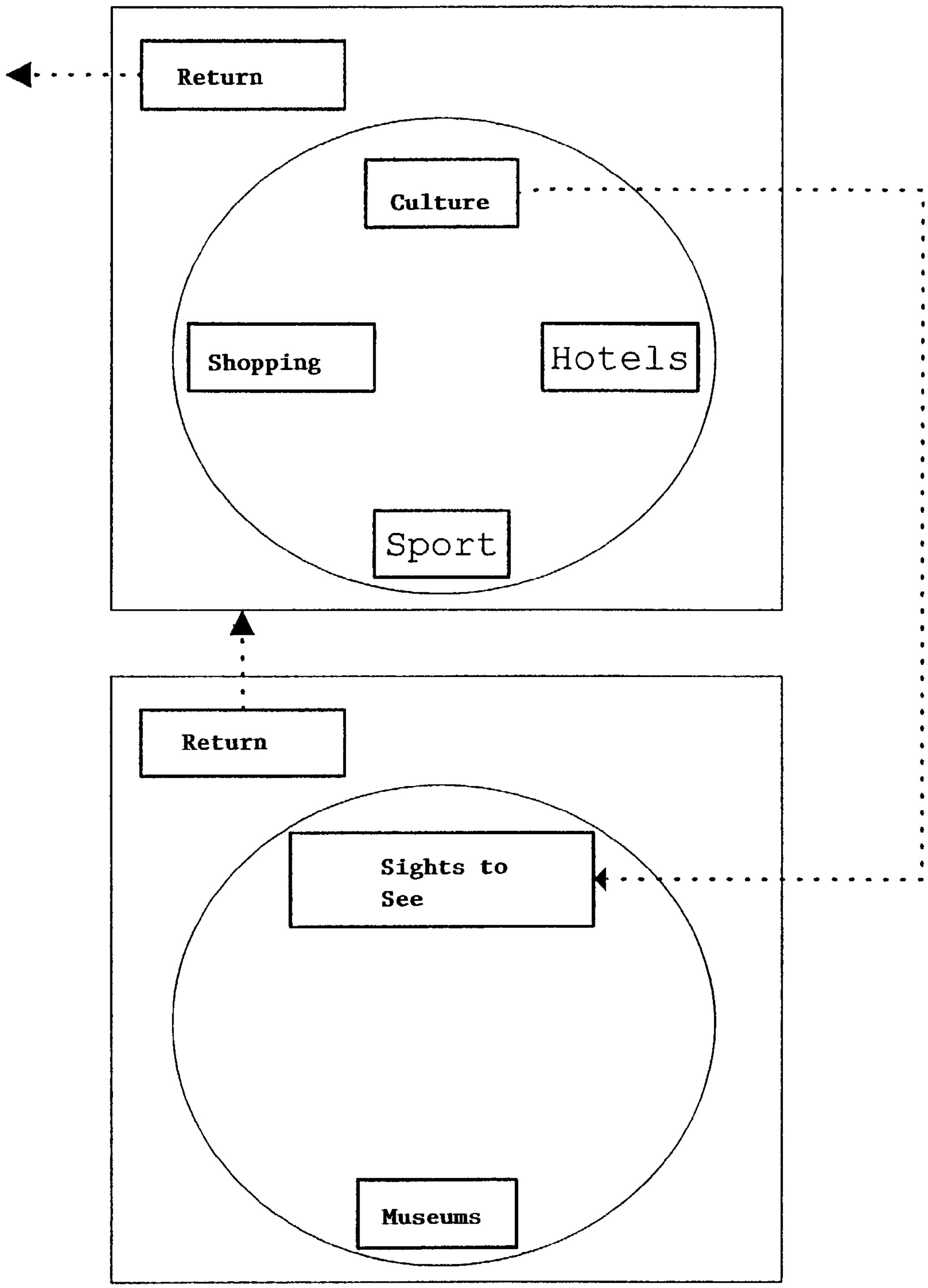
FIG. 5 illustrates a menu tree with a 4-way operating element.

FIGS. 4 and 5 illustrate how the linking of a software component "Entertainment Information" downloaded from the Internet could be converted with the operating scheme of a four-way operating element. Illustrated in FIG. 4 is a corresponding operating element, as may be available for an information system 1 at operating station 2. The four-way operating element with the accompanying lettering of the selection possibilities is illustrated on the display of information system 1.

The selected application is to consist of the five functions, "Sights to see, Museums, Hotels, Sports, Shopping". For each function a list of all lines present in the surrounding field is illustrated. However, the set of input/output rules present in information system 1 is set to an operation via a four-element user element. Thus, not all functions can be directly addressed in one menu level. Information system 1, after making the admissibility check, will refuse the incorporation of the five functions in a menu. The component must thus adapt its component-input/output rule accordingly. This new incorporation in submenus could look as follows:

Environmental Information
  Culture
  Sights to see
  Museums
  Hotels
  Sports
  Shopping As illustrated in FIG. 5, a menu tree that can be depicted on the display of information system 1 in conformity with the four-way operating element arises from the shown structure.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for configuring an information system in a transport vehicle, in which a set of input/output rules is stored in a storage medium of the information system, the set of input/output rules configure an input, an output and/or input/output processes of the information system, the method comprising the acts of:

- sending a set of input/output rules of the information system to a component to be connected to the information system;
- preparing in response to said input/output rules of the information system, a component-input/output rule for the information system;
- transmitting the component-input/output rule to the information system; and
- integrating the component-input/output rule into the output, input and input/output processes of the information system.

2. The method according to claim 1, wherein, prior to integrating the component-input/output rule, the method comprises the act of checking whether the configuration of the output, the input and/or input/output processes by the component-input/output rule is permissible.

3. The method according to claim 1, wherein the component-input/output rule is downloaded from an external server via a telematic interface of the transport vehicle to the information system.

4. The method according to claim 1, further comprising the act of:

- preparing a particular message in the output in an event where the integration of the component is not possible, a component-input/output rule not admissible, or a component is decoupled from the information system.

5. The method according to claim 1, wherein at least one of the set of input/output rules and the component-input/output rule is transmitted via a wireless interface.

6. The method according to claim 1, further comprising the act of:

- prior to starting an integration process for a component to be integrated into the information system, checking as to whether the information system is in a ready state to perform the integration.

7. A system in a vehicle, comprising:

an information system;

a component coupled to the information system via a data bus;

an output for outputting information relating to the component and an input for driving the component;

a storage medium, assigned to the information system, in which input/output rules defining admissible input and output processes of the information system are stored;

wherein the component has a storage medium having a component-input/output rule, the component-input/output rule being transmitted to the information system; and wherein the information system comprises a validation system for checking the admissibility of the transmitted component-input/output rule.

8. The system according to claim 7, wherein a set of input/output rules is provided in the storage medium for the information system, the validation system checking, via the set of input/output rules, as to whether the transmitted component-input/output rule is admissible.

9. A method for configuring an information system in a transport vehicle, in which a set of input/output rules is stored in a storage medium of the information system, the set of input/output rules configure an input, an output and/or input/output processes of the information system, the method comprising the acts of:

sending a set of input/output rules of the information system to a component to be connected to the information system;

preparing in response to said input/output rules of the information system, a component-input/output rule for the information system;

transmitting the component-input/output rule to the information system;

integrating the component-input/output rule into the output, input and input/output processes of the information system;

releasing from the information system an already integrated component that is decoupled from the information system;

removing from the information system the component-input/output rules and corresponding input/output processes of the decoupled component; and providing information concerning the decoupled component to the output.

* * * * *